(12) United States Patent
Moore et al.

(10) Patent No.: US 8,218,335 B2
(45) Date of Patent: Jul. 10, 2012

(54) SPIDER CLIP FOR SECURING A CIRCUIT BOARD WITHIN A COMMUNICATIONS MODULE

(75) Inventors: Joshua Moore, Sunnyvale, CA (US); Stephen Todd Nelson, Santa Clara, CA (US); Hung Van Nguyen, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 1036 days.

(21) Appl. No.: 12/169,157

(22) Filed: Jul. 8, 2008

(65) Prior Publication Data

US 2009/0032291 A1 Feb. 5, 2009

Related U.S. Application Data

(60) Provisional application No. 60/949,163, filed on Jul. 11, 2007.

(51) Int. Cl.
*H05K 7/14* (2006.01)
*H05K 7/18* (2006.01)
(52) U.S. Cl. .................. 361/801; 361/799; 361/800
(58) Field of Classification Search .................. 361/730, 361/752, 796, 799, 800–803, 897, 810, 600, 361/704, 748, 753, 715, 707; 385/53, 76, 385/86, 88, 89, 92, 134
See application file for complete search history.

(56) References Cited

U.S. PATENT DOCUMENTS

| | | | | |
|---|---|---|---|---|
| 2,844,644 | A * | 7/1958 | Soule, Jr. ..................... | 174/354 |
| 5,218,760 | A * | 6/1993 | Colton et al. .................. | 29/845 |
| 5,267,125 | A * | 11/1993 | Liu ............................... | 361/816 |
| 5,513,996 | A * | 5/1996 | Annerino et al. .............. | 439/95 |
| 6,186,800 | B1 * | 2/2001 | Klein et al. .................... | 439/95 |
| 6,930,891 | B1 * | 8/2005 | Hama et al. ................... | 361/800 |
| 7,035,108 | B2 * | 4/2006 | Wakabayashi et al. ....... | 361/719 |
| 7,524,196 | B2 * | 4/2009 | Bond ............................. | 439/92 |
| 7,527,506 | B2 * | 5/2009 | Ball et al. ...................... | 439/92 |
| 7,626,832 | B2 * | 12/2009 | Muramatsu et al. .......... | 361/818 |

* cited by examiner

*Primary Examiner* — Hung S Bui
(74) *Attorney, Agent, or Firm* — Maschoff, Gilmore & Israelsen

(57) ABSTRACT

A clip for securing a component, such as a circuit board, within a communications module is disclosed. The clip may include a flat base with legs extending therefrom and resilient springs disposed at terminal ends of each of the legs. The legs may be configured to frictionally secure the clip to the module. For instance, the legs may secure the clip to a top shell portion of the module. The springs may be configured to resiliently compress against corresponding contact zones on the circuit board when the top shell is mated with a bottom shell of the module such that the circuit board is secured in place within the module. Accordingly, embodiments of the invention enable the quick and simple assembly of modules without the need for fasteners and other time-consuming and/or labor-intensive solutions conventionally implemented to secure circuit boards and other components within the modules.

20 Claims, 8 Drawing Sheets

SPIDER CLIP FOR SECURING A CIRCUIT BOARD WITHIN A COMMUNICATIONS MODULE

CROSS-REFERENCE TO RELATED APPLICATIONS

This application claims the benefit of U.S. Provisional Patent Application Ser. No. 60/949,163, entitled SPIDER CLIP FOR SECURING A CIRCUIT BOARD WITHIN A COMMUNICATIONS MODULE, filed Jul. 11, 2007, which application is herein incorporated by reference in its entirety.

BACKGROUND OF THE INVENTION

1. The Field of the Invention

The present invention generally relates to communications modules. In particular, the present invention relates to an apparatus configured to secure a printed circuit board or other component(s) within an optical transceiver module or other communications module.

2. The Related Technology

Computing and networking technology has transformed our world. As the amount of information communicated over networks steadily increases, high speed transmission becomes ever more critical. Many high speed data transmission networks rely on communications modules, such as optical transceivers, transponders, and similar devices, for facilitating transmission and reception of digital data embodied in the form of optical signals over optical fibers. Optical networks are thus found in a wide variety of high speed applications ranging from modest Local Area Networks ("LANs") to backbones that define a large portion of the infrastructure of the Internet.

Typically, data transmission in such networks is implemented by way of an optical transmitter (also referred to as an "electro-optic transducer"), such as a laser or Light Emitting Diode ("LED"). The electro-optic transducer emits light when current is passed through it, the intensity of the emitted light being a function of the magnitude of the current. Data reception is generally implemented by way of an optical receiver (also referred to as an "opto-electronic transducer"), an example of which is a photodiode. The opto-electronic transducer receives light and generates a current, the magnitude of the generated current being a function of the intensity of the received light.

Various other components are also employed by the optical transceiver to aid in the control of the optical transmit and receive components, as well as the processing of various data and other signals. For example, the optical transmitter is typically housed in a transmitter optical subassembly ("TOSA"), while the optical receiver is housed in a separate receiver optical subassembly ("ROSA"). The transceiver also typically includes a driver (e.g., referred to as a "laser driver" when used to drive a laser signal) configured to control the operation of the optical transmitter in response to various control inputs and an amplifier (e.g., often referred to as a "post-amplifier") configured to amplify the channel-attenuated received signal prior to further processing. A controller circuit (hereinafter referred to as the "controller") controls the operation of the laser driver and post-amplifier. The laser driver, post-amplifier, and controller are typically included on a printed circuit board ("PCB") included within the transceiver. The TOSA and ROSA are operably connected to the printed circuit board so as to enable signals to pass between the TOSA/ROSA and the PCB-mounted components.

An ever-present desire in the art relates to simplifying the assembly procedures for optical transceiver modules. For instance, the use of a screw or other fastener typically employed to secure the PCB to the interior of the transceiver housing can represent a relatively labor intensive procedure during transceiver assembly. As such, assembly of the transceiver can be undesirably delayed.

In addition, a screw or other fastener used to secure the PCB typically passes through a central portion of the PCB so as to ensure a secure fixation of the PCB against the transceiver housing. The central region of the PCB, however, is a highly desirable location in terms of the desirability for the placement of various electronic components. In contrast, the perimeter portions of the PCB are not as highly utilized.

A need therefore exists for an optical transceiver module including a printed circuit board having a simplified configuration that enables the printed circuit board to be secured within the transceiver quickly and simply so as to speed assembly time for the transceiver. Moreover, a need exists to maximize the usable surface area of prime portions of the printed circuit board.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF THE INVENTION

These and other limitations are overcome by embodiments of the invention which relate to systems and methods for securing components within communications modules. More particularly, embodiments of the invention relate to a resilient clip for securing a printed circuit board or other component within a communications module, such as an optical transceiver module. Use of such a clip can simplify communications module design, hasten communications module assembly, and/or increase usable printed circuit board ("PCB") space.

An example resilient clip according to embodiments of the invention can include a base, two or more legs extending from the base that are configured to frictionally secure the clip to a communications module, and two or more springs-one each included at corresponding ends of the legs—that are configured to resiliently compress against corresponding contact zones on a circuit board disposed within the communications module when the communications module is assembled. To enable the resilient nature of the springs and/or other portions of the clip, the clip can contain metal, metal alloys, plastic, or the like or any combination thereof. The clip can further include two or more paired clips extending from the base in the opposite direction from the legs that can be implemented to further secure the clip to the communications module. Alternately or additionally, the clip can further include two or more extended portions to provide structural rigidity to the base and/or to disrupt EMI present in the communications module.

A clip according to embodiments of the invention may be implemented in any of a variety of communications modules. For instance, the clip can be implemented in a transceiver module that includes a top shell portion and a bottom shell portion defining a cavity, and a circuit board disposed in the cavity. The legs of the clip can be configured to frictionally secure the clip to the top shell. In some cases, the legs of the clip can be configured to frictionally engage corresponding surfaces or features of the top shell to thereby secure the clip to the top shell.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Reference will now be made to the figures wherein like structures will be provided with like reference designations. It is understood that the figures are diagrammatic and schematic representations of presently preferred embodiments of the invention, and are not limiting of the present invention, nor are they necessarily drawn to scale.

FIGS. 1-9 depict various features of embodiments of the present invention, which is generally directed to a resilient clip for securing a component, such as a printed circuit board, within a communications module, such as an optical transceiver module. Use of such a clip simplifies transceiver design, hastens transceiver assembly, and increases usable PCB space.

Figure 1:
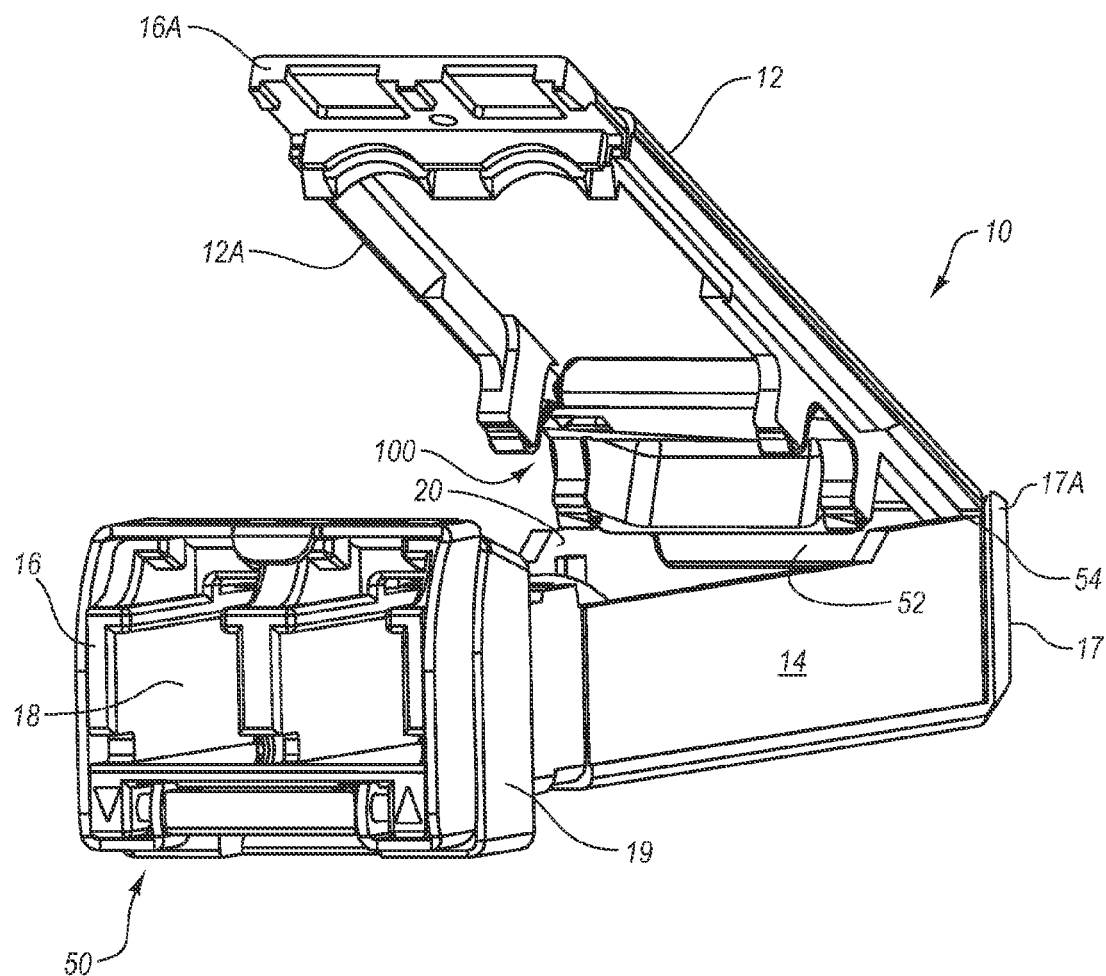
FIG. 1 is a perspective view of an optical transceiver module including a spider clip for securing a printed circuit board ("PCB") within the module interior, according to one example embodiment.
Figure 2:
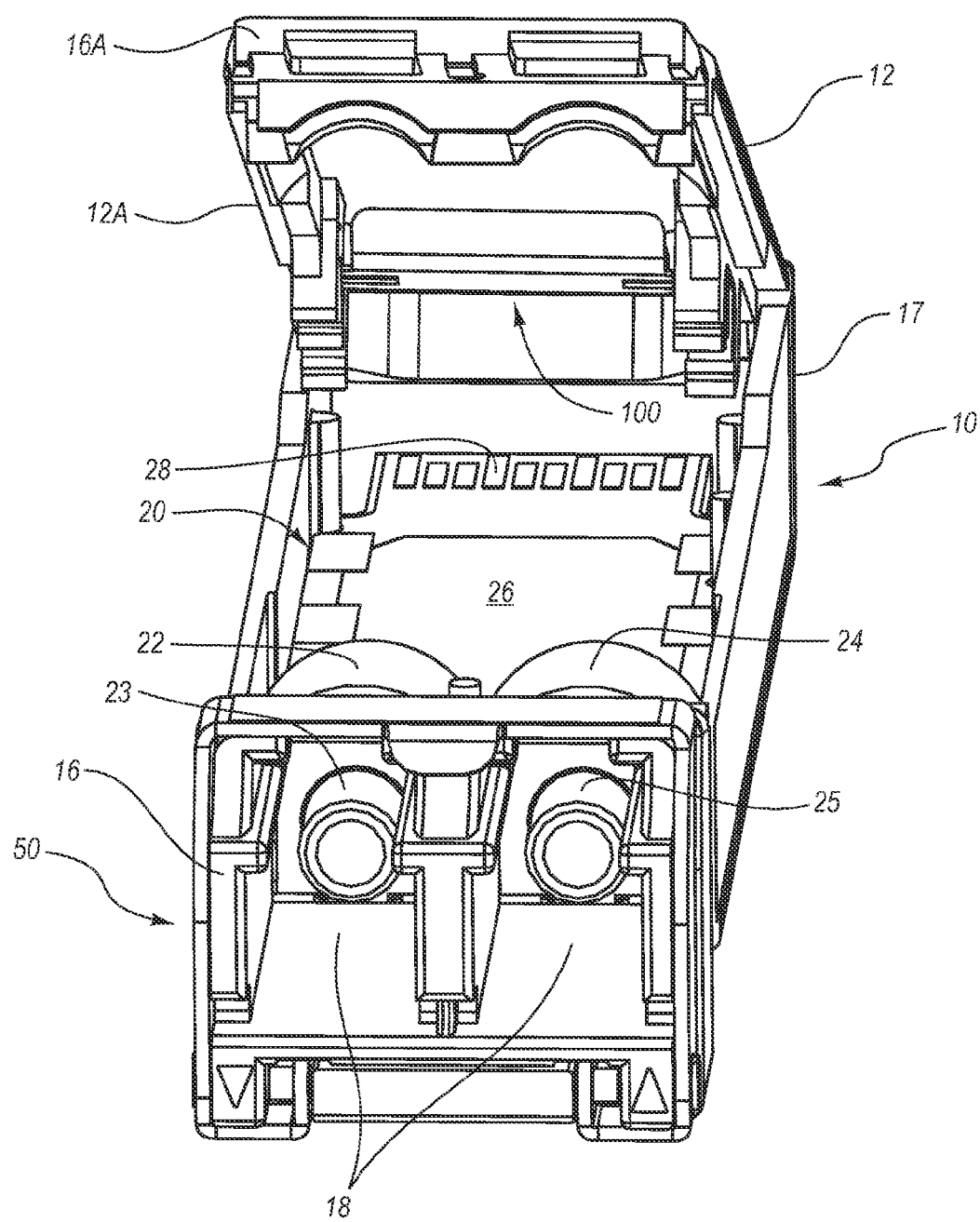
FIG. 2 is a perspective end view of the transceiver of FIG. 1, showing various features of the spider clip and related securing features.

Reference is first made to FIGS. 1 and 2, which show a communications module, specifically, an optical transceiver module ("transceiver"), generally designated at 10. Though having an SFP configuration, the transceiver 10 is merely representative of various communications modules and transceivers that can benefit from the principles of embodiments of the present invention as described herein.

As shown in FIG. 1, the transceiver 10 includes a body comprising a top shell portion 12 and bottom shell portion 14. The bottom shell portion 14 defines a front end 16 and a back end 17 of the transceiver 10, while the top shell portion 12 defines a corresponding front end 16A and back end 17A. The top shell portion 12 also defines an inner surface 12A that bounds the interior of the transceiver when assembled.

Included on the front end 16 of the transceiver bottom shell portion 14 are two ports 18 configured to receive connectors of an optical fiber (not shown). The ports 18 define a portion of an interface portion 19 that is generally included on the front end 16 of the transceiver 10 and that includes the structures necessary to operably connect the transceiver 10 to optical fibers. Also disposed on the transceiver front end 16 is a bail latch assembly 50 that enables the transceiver to be selectively removed from a port, such as the port of a host device (not shown).

As best seen in FIG. 2, the bottom shell portion 14 defines a cavity 20 in which a transmitter optical subassembly ("TOSA") 22, a receiver optical subassembly ("ROSA") 24, and printed circuit board ("PCB") 26 are included as internal components of the transceiver 10. The TOSA 22 and ROSA 24 each include a nosepiece 23 and 25, respectively, that extends into a respective one of the ports 18 so as to be positioned to mate with the connector portion of an optical fiber (not shown) when received within each port.

A terminal end of the PCB 26 nearest the back end 17 of the transceiver 10 includes an edge connector 28 that is configured to operably connect with a corresponding connector (not shown) of the host device. In addition, a hinge 52 (FIG. 1) is defined on the back end 17A of the top shell portion 12 and is configured to cooperatively engage with a hinge seat 54 defined near the back end 17 of the bottom shell portion 14 so as to enable the two shell portions to mate, thereby enclosing the cavity 20. Of course, the transceiver or other communications module may include other types of mating configurations.

FIGS. 1 and 2 further depict a clip, generally designated at 100, that is attached to the top shell portion 12 and is configured to secure the PCB 26 in place within the cavity 20, as is explained in further detail below.

Note that, while described in some detail herein, the optical transceiver 10 is discussed by way of illustration only, and not by way of restricting the scope of the invention. For example, the optical transceiver 10 in one embodiment can be suitable for optical signal transmission and reception at a variety of per-second data rates, including but not limited to 1 Gigabit per second ("1 G"), 2 G, 4 G, 8 G, 10 G, or higher bandwidth fiber optic links. Also, the principles of the present invention can be implemented in optical transceivers of any form factor such as XFP, SFP, SFP+, IPF and SFF, without restriction. Furthermore, communications modules of other types and configurations, such as optical transponder modules, or having components that differ in some respects from those shown and described herein, can also benefit from the principles disclosed herein.

During operation, the transceiver 10 can receive a data-carrying electrical signal from a host, which can be any computing system capable of communicating with the optical transceiver 100, for transmission as a data-carrying optical signal onto an optical fiber (not shown). The electrical differential data signal is provided to a light source, such as a laser located in the TOSA 22, which converts the electrical signal into a data-carrying optical signal for emission on to an optical fiber and transmission via an optical communications network, for instance. The laser (not shown) can be an edge-emitting laser diode, a vertical cavity surface emitting laser ("VCSEL"), a distributed feedback ("DFB") laser, or other suitable light source. Accordingly, the TOSA 22 serves as an electro-optic transducer.

In addition, the transceiver 10 can be configured to receive a data-carrying optical signal from an optical fiber (not shown) via the ROSA 24. The ROSA 24 acts as an opto-electric transducer by transforming the received optical signal, via a photodetector or other suitable device included in the ROSA, into an electrical signal. The resulting electrical signal is then provided to the host device in which the transceiver 10 is received.

Figure 3A:
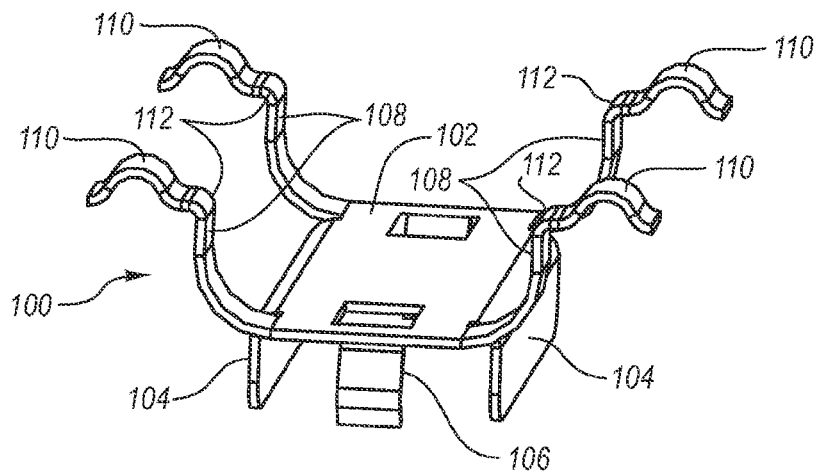
FIGS. 3A-3C include various views of the spider clip configured according to one embodiment.
Figure 3B:
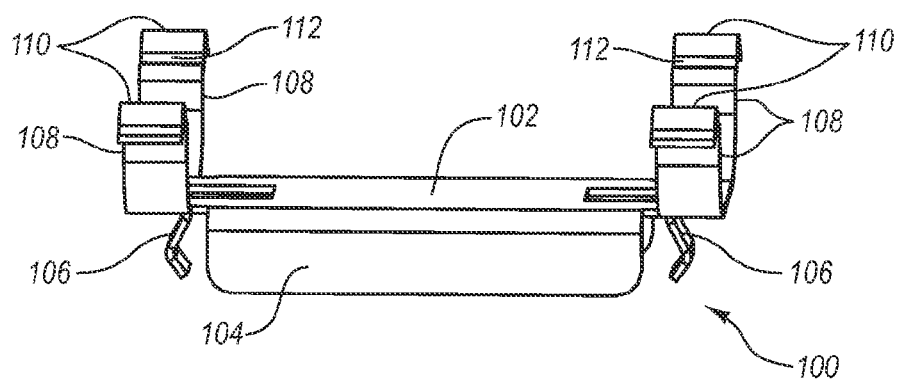
Figure 3C:
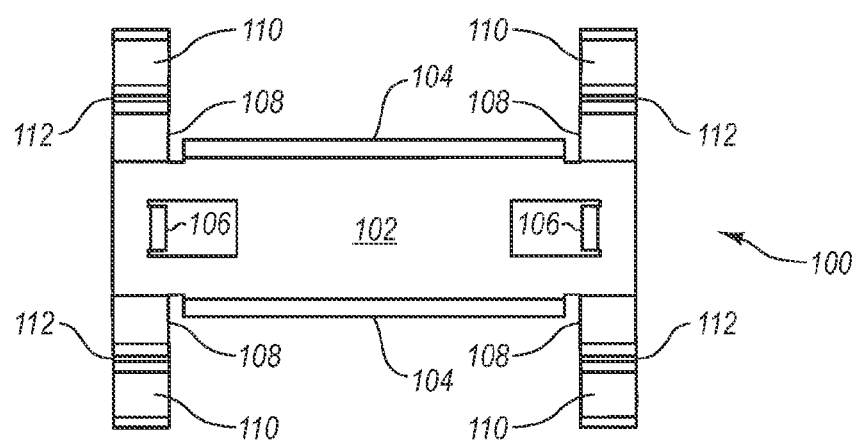

Reference is now made to FIGS. 3A-3C in describing various details regarding the clip 100, according to an example embodiment. As shown, the clip 100 may include a flat base 102 having integrally formed extended portions 104 extending therefrom in a downward direction, as viewed from the perspective depicted in FIG. 3A. Two clips 106 may also extend downward from the base and may be configured for resiliently engaging portions of the top shell portion 12 in order to secure the clip onto the top shell portion, as will be described further below. The clips 106 may optionally be referred to herein as "paired clips" to distinguish them from the clip 100, there being one clip 106 on each of opposite sides of the base 102.

Note that the extended portions 104 of the clip 100 can be designed to provide structural rigidity to the clip 100 between the paired clips 106. In an example embodiment, the extended portions 104 can also be employed to disrupt electromagnetic interference ("EMI") that may be present in the transceiver 10.

Four legs 108 extend from each of the four corners of the base in an arcing (e.g., "arc-wise") upward direction as viewed from the perspective depicted in FIG. 3A. A resilient spring portion 110 can be included at a terminal end of each leg 108, interconnected thereto by an interconnecting portion 112. Each spring portion 110 can be arc-shaped and resiliently formed to allow for a compressive force to be imposed on the PCB 26 when the transceiver 10 is assembled, as will be explained. Alternatively, the spring portions can define other shapes and configurations to enable resilient deformation thereof. To enable the spring portions 110 to be resilient, the clip 100 can contain: a metal or metal alloy, such as 301 or 302 stainless steel having a suitable one of a variety of spring hardness ratings; a plastic such as PA66, ABS; or the like or any combination thereof.

Figure 4:
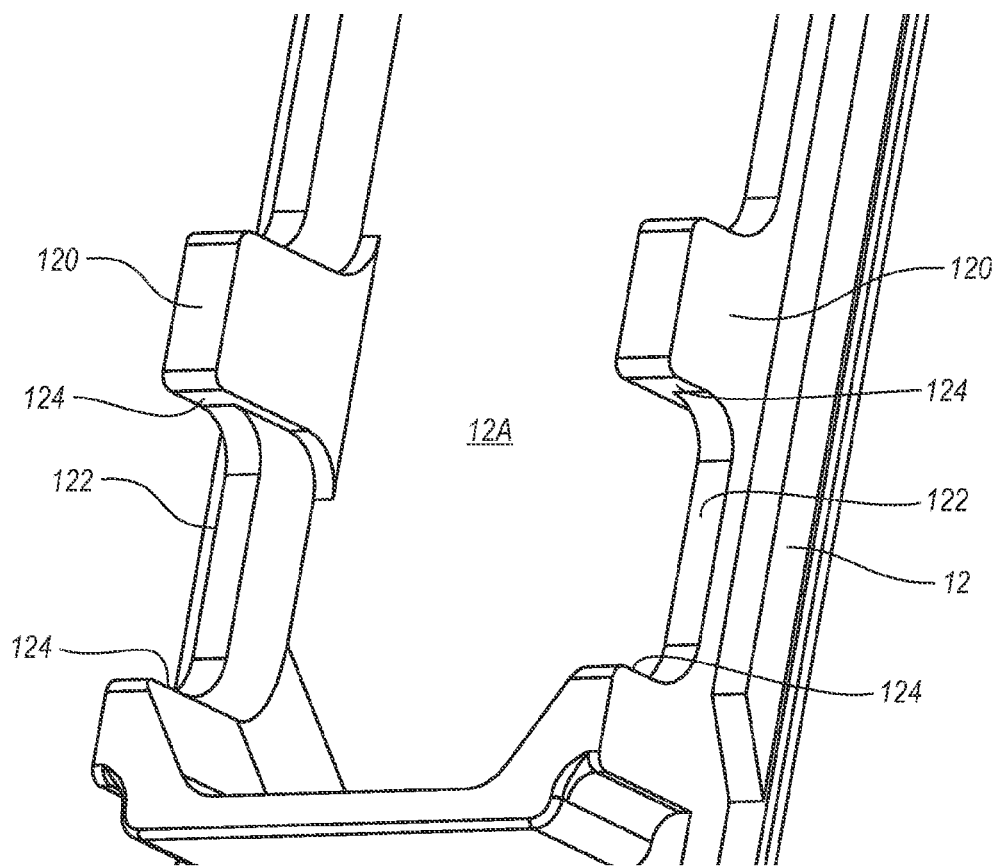
FIG. 4 is a perspective view of a top shell portion of the optical transceiver module of FIG. 1.

Reference is now made to FIG. 4, which shows in detail the top shell portion 12. The top shell portion 12 includes two side walls 120, each having an inner surface 120A. The side walls 120 each include a cutout 122 that is bounded by shoulders 124. The described region of the top shell portion 12 serves as an example location of the clip 100 for use in securing the PCB 26 to the interior of the transceiver. Of course, modifications to either or both the clip and top shell portion can be made in other embodiments while still being encompassed by the claims of the present invention.

Figure 5:
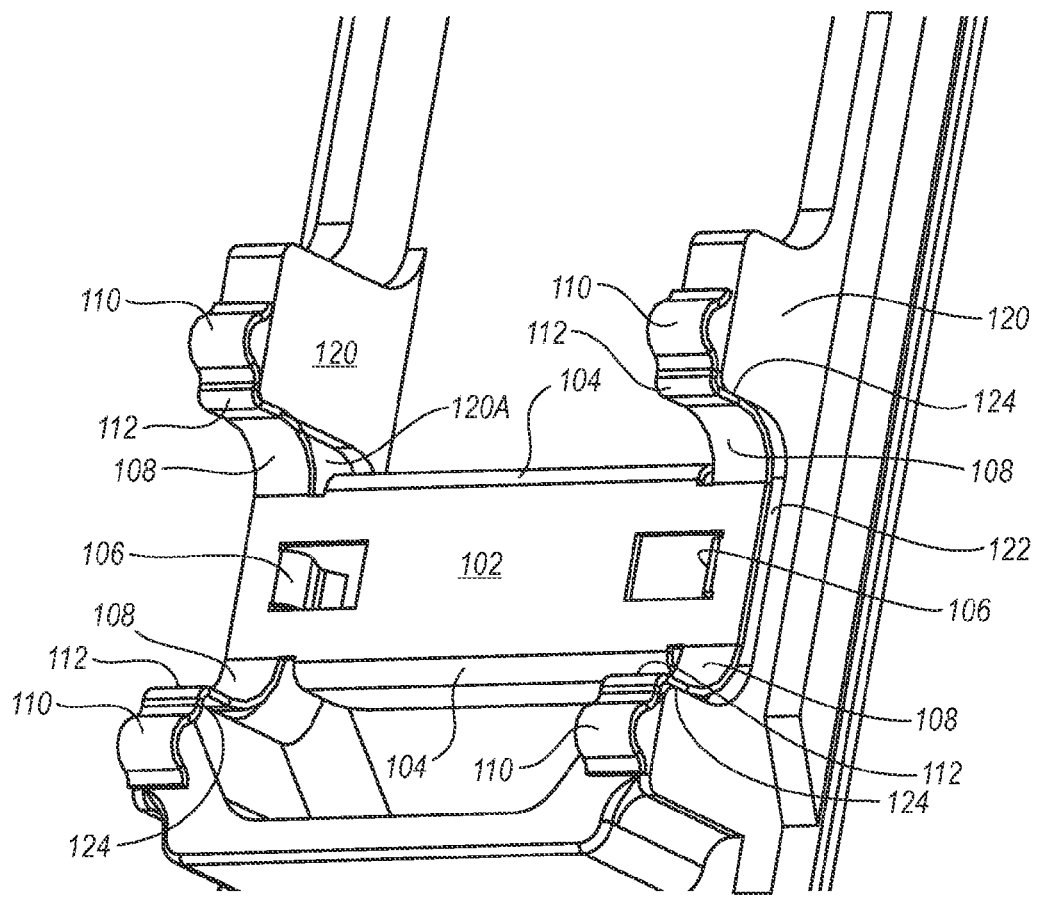
FIG. 5 is a perspective view of the top shell portion of FIG. 4 having a spider clip affixed thereto.
Figure 6:
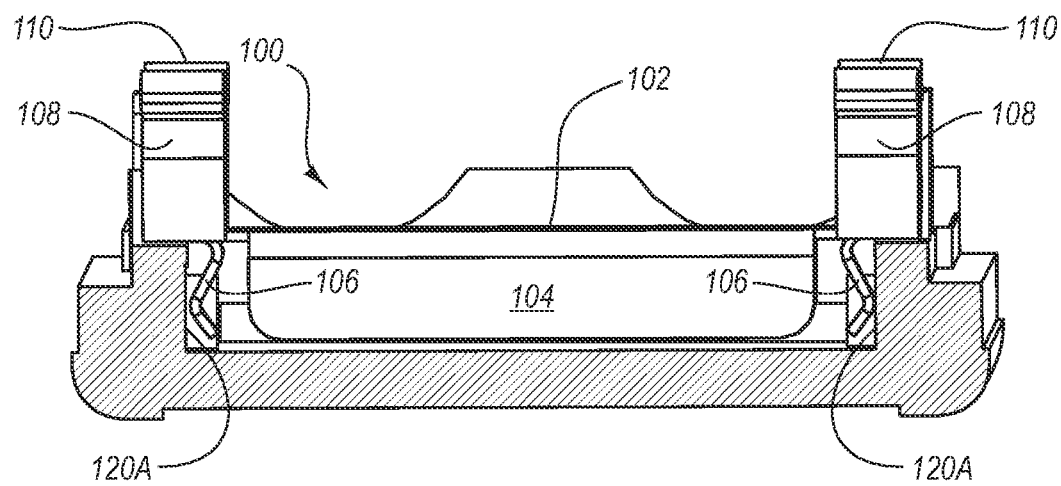
FIG. 6 is a cross-sectional view of the top shell portion of FIG. 4 and spider clip attached thereto.
Figure 7:
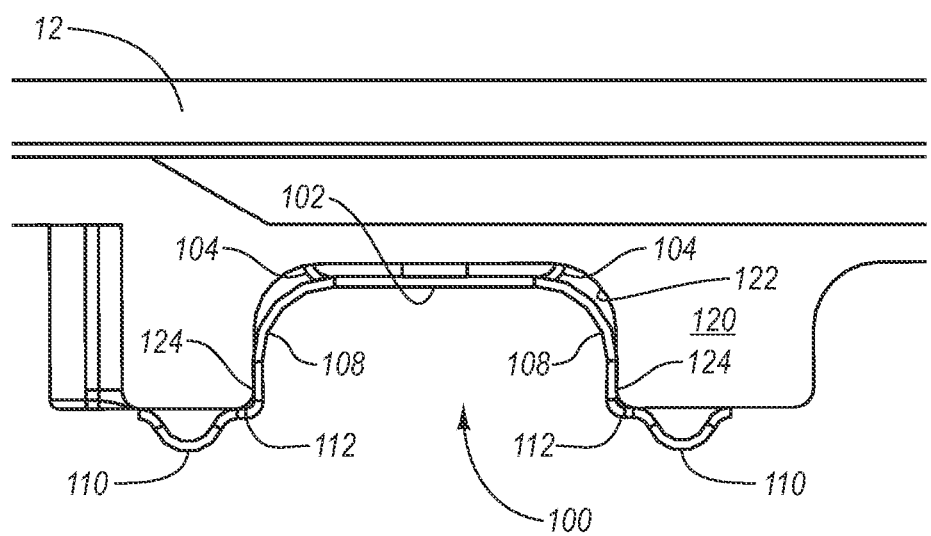
FIG. 7 is a side view of the top shell portion of FIG. 4 having the spider clip affixed thereto.

FIGS. 5-7 depict in further detail the manner of attachment of the clip 100 to the top shell portion 12 of the transceiver 10, in accordance with an example embodiment. As shown, the clip 100 can be placed such that edge portions of the clip base 102 are positioned against a portion of the side wall cutouts 122 and such that each leg 108 is positioned adjacent the correspondingly shaped portions of the cutouts. The interconnecting portion 112 of each leg 108 can frictionally engage the shoulder 124 of side wall cutouts 122, thereby placing each spring portion 110 atop the corresponding side wall 120 proximate the respective cutout and holding the clip in place. As such, the legs 108 serve as one means for frictionally securing the clip 100 (and base 102) to the module 10. The manner in which the legs 108 extend from the clip base 102 in the present example gives the clip a "spider"-like appearance, for which the clip 100 is also referred to herein as a "spider clip."

As best seen in FIG. 6, the clip 100 can alternately or additionally be secured in the position shown in FIGS. 5-7 by engagement of the clips 106 with the inner surfaces 120A. The clip engagement with the inner side wall surface 120A can be a friction fit, which enables the clip 100 to be secured to the top shell portion 12 while also allowing for its simple removal from the transceiver 10, when necessary. As such, the clips 106 serve as another means for frictionally securing the clip 100 (and base 102) to the module 10. Note that other friction fit or securing schemes can be devised to secure the clip to the top shell portion, as may be appreciated by one skilled in the art with the benefit of the present disclosure.

Figure 9:
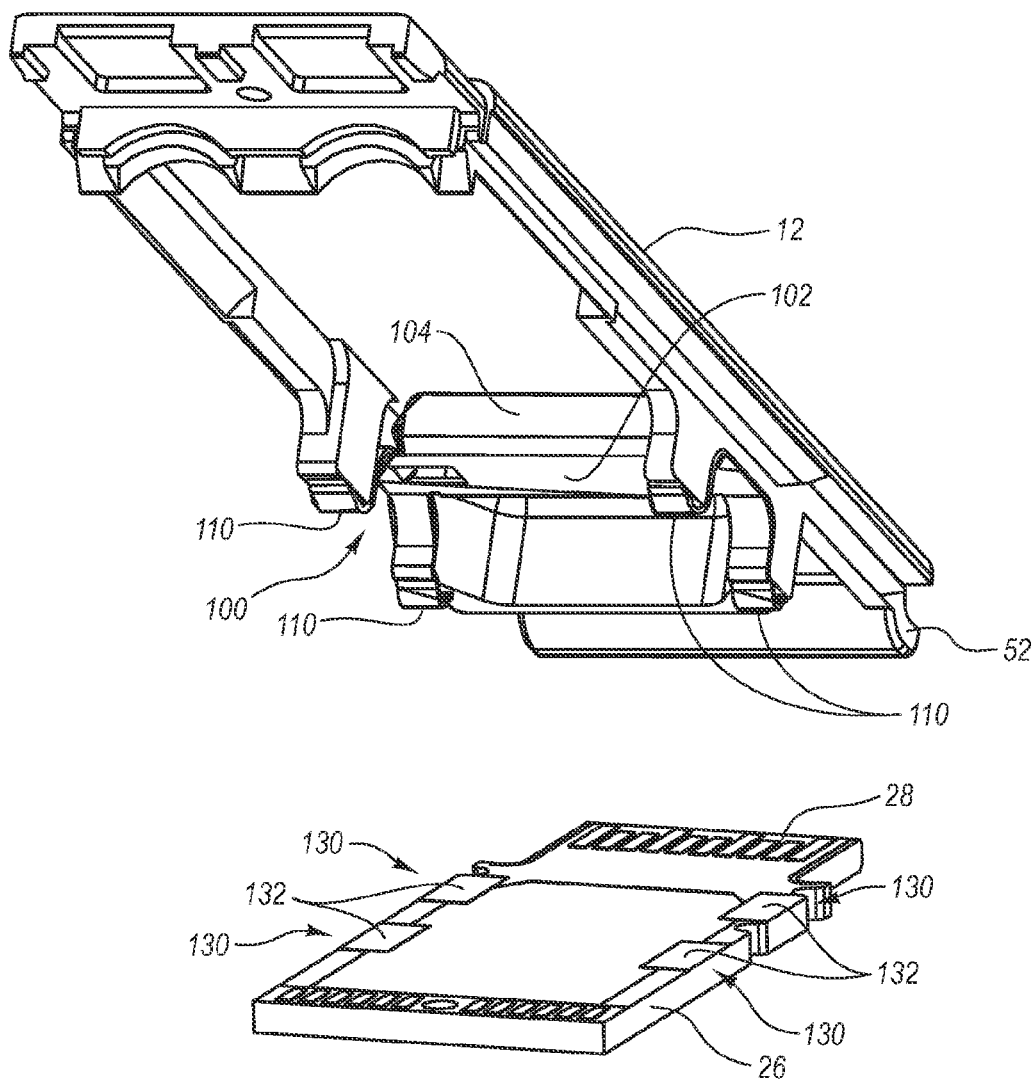
FIG. 9 is a perspective view of a top shell portion and printed circuit board, showing the orientation of the spider clip with respect to the contact zones of the printed circuit board.

In light of the above, it is recognized that the clip structure illustrated in FIG. 9 is formed so as to cooperatively fit with the shape of the top shell portion, specifically, the cutout portions 122. Thus, it may be appreciated that the clip structure may be altered from what is explicitly shown so as to conform to attachment with a variety of shell shapes and/or transceiver structures.

Figure 8:
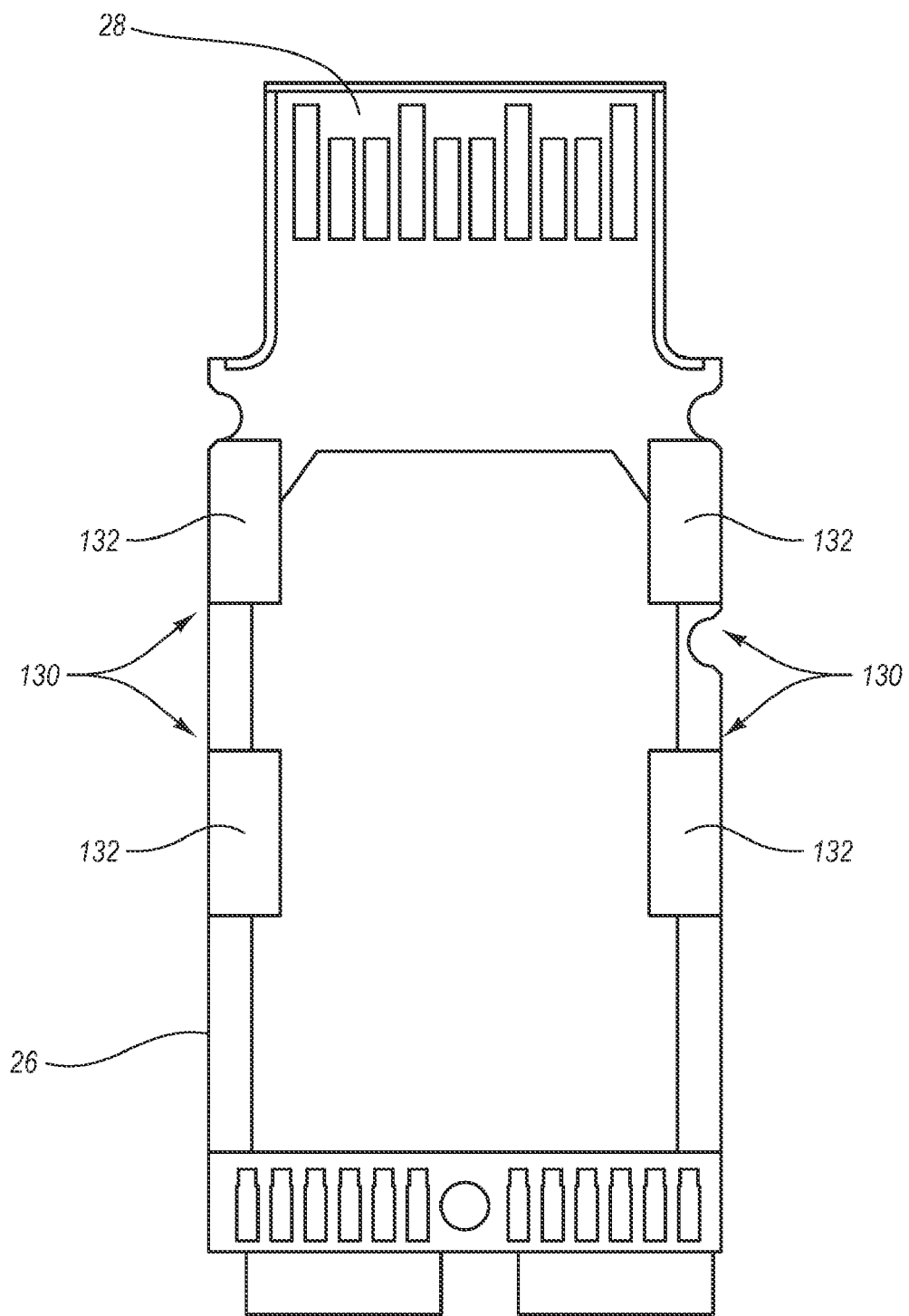
FIG. 8 is a top view of the printed circuit board of FIG. 2 showing contact zones for use with the spider clip of FIGS. 3A-3C.

FIG. 8 shows a top view of the PCB 26 of FIGS. 1 and 2 that can be disposed within the cavity 20 of the transceiver 10 (FIG. 2). In accordance with embodiments of the invention, the top surface of the PCB 26 may include a plurality of zones 132 positioned at predetermined contact regions 130. The contact regions 130 may correspond to points of contact of the clip 100 with the PCB 26 when the top shell portion 12 is mated with the bottom shell portion 14 as part of the transceiver assembly process.

FIG. 9 shows the relative positional relationship between the zones 132 of the PCB 26 and the spring portions 110 when the PCB is disposed within the bottom shell portion (not shown). When the transceiver 10 is assembled, the clip 100 is attached to the corresponding portion of the top shell portion 12, as has been depicted and described above. The top shell portion 12 can then be brought into a mated configuration with the bottom shell portion 14, wherein the hinge 52 of the top shell portion engages the hinge seat 54 of the bottom shell portion. Mating of the two shell portions 12 and 14 causes the spring portions 110 of the clip 100 to come in contact with the zones 132 at the contact regions 130. The tolerances of the clip 100 can be such that each spring portion 110 deforms slightly as it presses down on the PCB 26 as the two shell portions 12 and 14 are mated. This in turn provides a force on the PCB 26 to urge it into a secured position at the bottom of the PCB cavity 20. As long as the transceiver shell portion 12 and 14 remain in a mated configuration, the clip 100 can ensure the PCB remains fixed in position within the transceiver 10, as desired.

Embodiments of the present invention may alternately or additionally provide for easy removal of the PCB 26 from the transceiver should such removal be necessary or desired. To remove the PCB 26, the top and bottom shell portions 12 and 14 can be separated. Such separation can also remove the clip 100 from engagement with the PCB 26. The PCB 26 is then easily removable from the transceiver 10. Note that the number or position of the spring portions 110 included on the clip 100 can be varied to suit the particular securing or other needs for the PCB.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A clip for securing a component within a communications module, the clip comprising:
   a base;
   means for frictionally securing the base to the communications module; and
   a plurality of spring portions included at corresponding ends of a plurality of legs that extend from the base, the spring portions configured to resiliently compress against corresponding contact zones of a circuit board disposed within the communications module when the communications module is assembled, such that the circuit board is secured in place within the communications module,
   wherein the means for frictionally securing includes two paired clips extending from the base in the opposite direction from the legs, the paired clips configured to frictionally engage corresponding surfaces of the communications module to secure the base to the communications module.

2. The clip of claim 1, wherein the clip is formed from metal or metal alloy.

3. The clip of claim 2, wherein the metal or metal alloy includes 301 stainless steel or 302 stainless steel having a suitable spring hardness rating.

4. The clip of claim 1, wherein the clip is formed from plastic.

5. The clip of claim 4, wherein the plastic includes PA66 plastic or ABS plastic.

6. The clip of claim 1, wherein the means for frictionally securing further includes the plurality of legs, the plurality of legs configured to frictionally engage corresponding shoulders formed in a top shell portion of the communications module to frictionally secure the base to the communications module.

7. The clip of claim 1, further comprising two extended portions extending from the base in the same direction as the paired clips, the extended portions being interposed between the paired clips around a periphery of the base.

8. The clip of claim 7, wherein the extended portions: provide structural rigidity to the base between the paired clips, disrupt electromagnetic interference present in the communications module, or any combination thereof.

9. The clip of claim 1, wherein the frictional fit between the legs and the communications module allows the clip to be easily removed from the communications module.

10. The clip of claim 1, wherein the two paired clips are configured to bias away from one another against the corresponding surfaces of the communications module to secure the base to the communications module.

11. An optical communications module, comprising:
    a bottom shell portion;
    a top shell portion that cooperates with the bottom shell portion to define a cavity, the top shell portion including a plurality of sidewalls, each sidewall including a cutout bounded by two shoulders;
    a circuit board disposed in the cavity, the circuit board including a plurality of contact zones on a top face; and
    a clip configured to secure the circuit board in place within the cavity, the clip including:
      a base;
      a plurality of legs extending from the base, the legs configured to be positioned adjacent corresponding shaped portions of the cutouts such that the legs frictionally engage the shoulders to secure the clip to the top shell portion; and
      a plurality of spring portions each included with a corresponding one of the legs, the spring portions configured to resiliently compress against a corresponding one of the contact zones when the top shell portion is mated with the bottom shell portion such that the circuit board is secured in place within the cavity.

12. The module of claim 11, wherein the clip further includes two paired clips extending from the base in the opposite direction from the legs, the paired clips being disposed on opposite edges of the base, each of the paired clips adapted to frictionally engage an inner surface of one of the sidewalls.

13. The module of claim 12, wherein the clip further includes a plurality of extended portions extending from the base in the same direction as the paired clips, the extended portions providing structural rigidity to the clip.

14. The module of claim 11, wherein the module is substantially compliant with one or more of: the XFP form factor, the SFP form factor, the SFP+ form factor, the IPF form factor, or the SFF form factor.

15. An optical transceiver module, comprising:
    a bottom shell portion;
    a top shell portion that cooperates with the bottom shell portion to form a cavity, the top shell portion including a plurality of side walls with a cutout and shoulders formed in each sidewall;
    a circuit board disposed in the cavity, the circuit board including a top face with a plurality of contact zones disposed thereon; and
    a clip configured to secure the circuit board in place within the cavity, the clip including:
      a base;
      a plurality of legs extending arc-wise from the base, the legs configured to frictionally engage corresponding shoulders formed in the side walls and thereby secure the clip to the top shell portion; and
      a plurality of spring portions included at corresponding terminal ends of the legs, each of the spring portions configured to resiliently deform against a corresponding one of the contact zones when the top shell portion is mated with the bottom shell portion such that the circuit board is secured in place within the cavity.

16. The module of claim 15, wherein the cutouts are shaped to allow the legs to be positioned adjacent to correspondingly shaped portions of the cutouts.

17. The module of claim 15, wherein the spring portions are configured to be disposed between the side walls and corresponding contact zones upon assembly such that when the top shell portion is mated with the bottom shell portion, the spring portions are deformed between side walls and corresponding contact zones, and wherein restorative forces from the spring portions act on the contact zones to secure the circuit board at the bottom of the cavity.

18. The module of claim 15, wherein securing the circuit board within the cavity using the clip is less labor intensive and quicker than securing a circuit board within a cavity of an optical transceiver module using a screw or other fastener.

19. The module of claim 15, further comprising two paired clips interposed between two extended portions along a periphery of the base, the two paired clips and the two extended portions extending from the base in the opposite direction from the legs to further secure the clip to the top shell portion and to provide structural rigidity to the clip.

20. The module of claim 19, wherein the two paired clips are configured to bias away from one another against the top shell portion in order to frictionally engage corresponding surfaces of the top shell portion and thereby further secure the clip to the top shell portion.

* * * * *